United States Patent
Waggott et al.

[11] Patent Number: 5,277,403
[45] Date of Patent: Jan. 11, 1994

[54] BALANCED, STEAM CONTROL VALVE ASSEMBLY, AND A PLUG-TYPE VALVING ELEMENT THEREFOR

[75] Inventors: John Waggott, Wellsville; George M. Lucas, Scio, both of N.Y.

[73] Assignee: Dresser-Rand Company, Corning, N.Y.

[21] Appl. No.: 60,961

[22] Filed: May 12, 1993

[51] Int. Cl.$^5$ .................... F16K 1/00; F16K 39/02
[52] U.S. Cl. .................... 251/282; 251/324; 251/333
[58] Field of Search ............... 251/282, 324, 333

[56] References Cited

U.S. PATENT DOCUMENTS

| | | | |
|---|---|---|---|
| 1,112,233 | 9/1914 | Stevens | 251/282 X |
| 3,572,382 | 3/1971 | Luthe | 251/282 X |
| 3,805,839 | 4/1974 | Baumann | 251/282 X |
| 4,137,934 | 2/1979 | Rice et al. | 251/282 X |
| 4,274,433 | 6/1981 | Schnall | 251/282 X |
| 4,557,463 | 12/1985 | Tripp et al. | 251/282 X |
| 4,679,769 | 7/1987 | Dawawala et al. | 251/282 |
| 4,766,932 | 8/1988 | Heymann et al. | 251/282 X |
| 4,834,133 | 5/1989 | LaCoste et al. | 251/282 X |

*Primary Examiner*—John Rivell
*Attorney, Agent, or Firm*—Bernard J. Murphy

[57] ABSTRACT

A substantially cylindrical, plug-type configuration of the element offers a mass which is less responsive to non-uniform and unsteady pressures, and channeling therein opens centrally, and about the periphery thereof, onto a recess formed in an end of the element which closes onto a valve seat. The channeling and recess are cooperative to assure that the balance-end of the element will have average, representative pressures conducted thereto.

10 Claims, 3 Drawing Sheets

BALANCED, STEAM CONTROL VALVE ASSEMBLY, AND A PLUG-TYPE VALVING ELEMENT THEREFOR

This invention pertains to steam control valves, and plug-type valving elements therefor, such as are interposed between a steam chest and a steam turbine inlet, which accept steam from the chest and valvingly distribute steam to annular sectors of the tubine inlet, and in particular to an improved, balanced, steam control valve assembly, and a plug-type valving element for such a balanced, steam control valve assembly.

Steam control valves for steam tubines have, over time, become larger and are required to operate with higher pressures. This results in very large forces that are beyond the capabilities of the known, conventional valve control systems. A prior art solution was to balance the aforesaid forces by adding a balance piston to the valve stem which slidably reciprocates in a cylinder or guide. In this, pressure obtaining at the base of the plug-type valve is communicated, through internal passages, to the opposite end of the valve, i.e., the plug-type valving element. This expedient approximately balanced the forces. Because of the evolved nature of this design, the plug-type valving element, having a plug at one end and the balance piston at the other end, was perceived as comprising distinct elements and, accordingly, it was manufactured with a conspicuous but unnecessary neck therebetween. Too, as a convenience in manufacturing, the valving elements were formed from actually separate components; the larger diameter plug and balance piston received a stem by means of "T"-slot arrangement.

Towards the high limits of size and pressure for such valving elements, problems with vibration, position control and stem breakage have been experienced.

It is an object of this invention to set forth an improved, balanced, steam control valve assembly, and a plug-type valving element therefor, which avoid the aforesaid problems.

It is particularly an object of this invention to set forth a balanced, steam control valve assembly comprising an annular valve seat; a plug-type valving element for closure upon, a removal from, said seat; and a valve bonnet having a central, longitudinal bore formed therethrough; wherein said valving element has a valving head and a stem; said stem is slidably engaged with said bore; said bonnet has a depending, cylindrical guide; said is slidably engaged with said guide; said head has a fluid-accommodating channel means formed therein for pressure-balancing one end of said head with an opposite end of said head; and one end of said head has means formed therein for insuring that an average and representative pressure obtaining thereat will be addressed to an opposite end of said head via said channel means.

It is also an object of this invention to disclose a plug-type valving element, for a balanced, steam control valve assembly, comprising a valving head for an integral stem; wherein said head has a fluid-accommodating channel means formed therein for pressure-balancing one end of said head with an opposite end of said head; and one end of said head has means formed therein for insuring that an average and representative pressure obtaining thereat will be addressed to an opposite end of said head via said channel means.

Further objects of this invention, as well as the novel features thereof, will become apparent by reference to the following description, taken in conjunction with the accompanying figures, in which.

Figure 1:
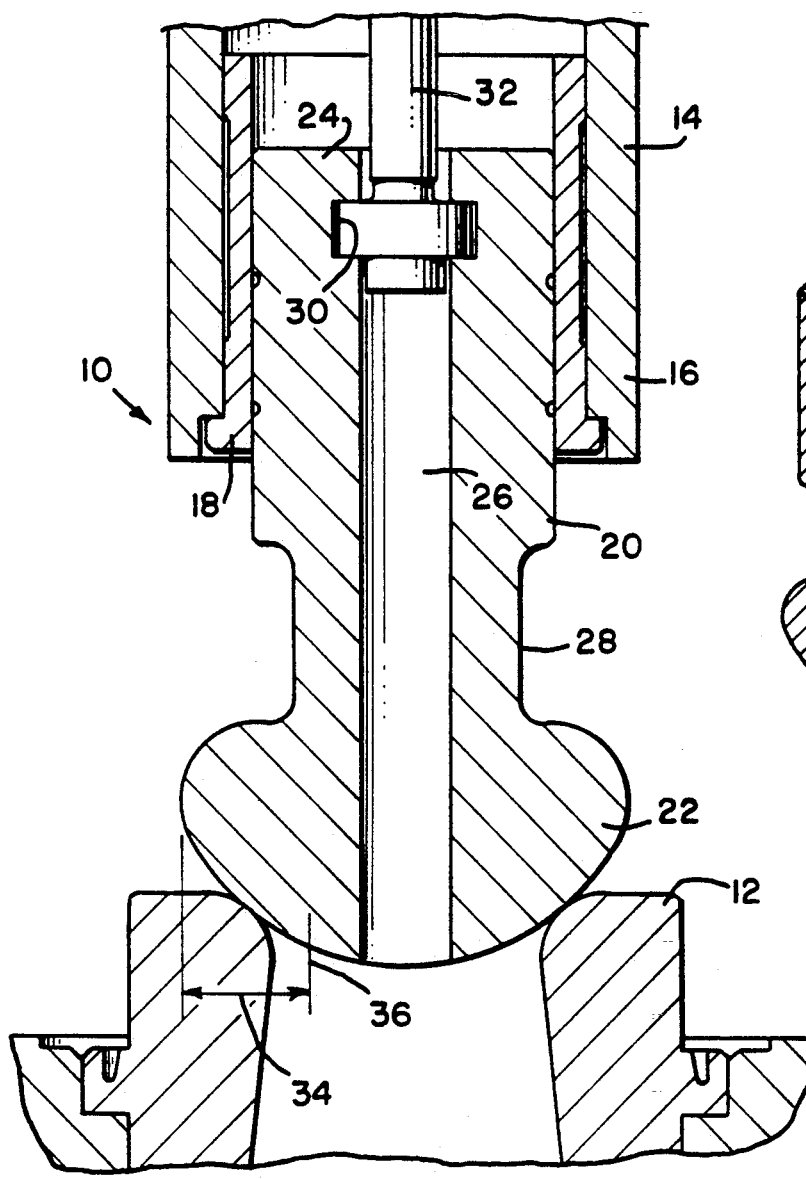
FIG. 1 is a cross-sectional view of a prior art, steam control valve assembly, the same having the aforementioned "T"-slot connection arrangement.

As shown in FIG. 1, the prior art steam control valve assembly 10 comprises a venturi-configured valve seat 12, and a valve bonnet 14, having a valve guide 16 depending therefrom, the guide having a valve guide bushing 18 secured therein. The plug-type valving element 20 has a rounded, plug end 22 which seats upon and removes from the seat 12, and cylindrical balance-piston end 24. End 24 is slidably reciprocable in the guide 16 via the bushing 18, and has a central, longitudinal and throughgoing bore 26. Ends 22 and 24 are joined through a neck portion 28. Within the balance-piston end 24 is formed a straight groove 30 which receives therein a "T"-connection end of the valving element stem 32. It has been concluded that the problems of such valve assemblies 10 proceed from non-uniform and unsteady pressures at the bottom of the plug end 22 and, consequently, the pressure communicated to the top of balance-piston end 24 is not representative of the average pressure obtaining at the bottom of the plug end 22. The bore 26 opens only onto the center of the bottom of the plug end 22 and, as noted, pressure thereat, and conducted to end 24, is likely to be unrepresentatively excursive. Additionally, the "T"-connection was found to have structural deficiencies.

The aforesaid non-uniform and unsteady pressures result from the long, curved surface of the plug end 22; steam flow passes between that surface and the seat 12. Pressures vary considerably in this region and the flow will separate at some unknown and variable point on the surface of plug end 22 after is has passed through the narrowest part of the region. As shown in FIG. 1, the rounded, plug end 22, coacting with the valve seat 12, defines a long or wide flow transition zone or region 34. The fluid contact length thereof, then, obtains between the outermost surface of plug end 22 and some indefinite point shown arbitrarily at 36.

Figure 2:
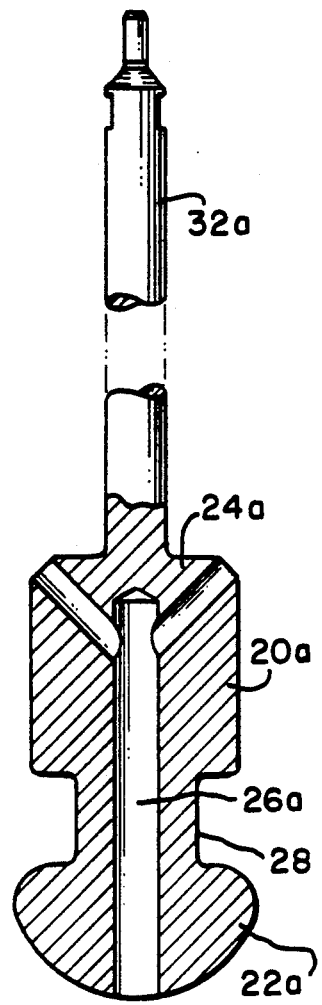
FIG. 2 is cross-sectional view of a prior art plug-type valving element in which the stem thereof is integral with the plug and balance piston.
Figure 3:
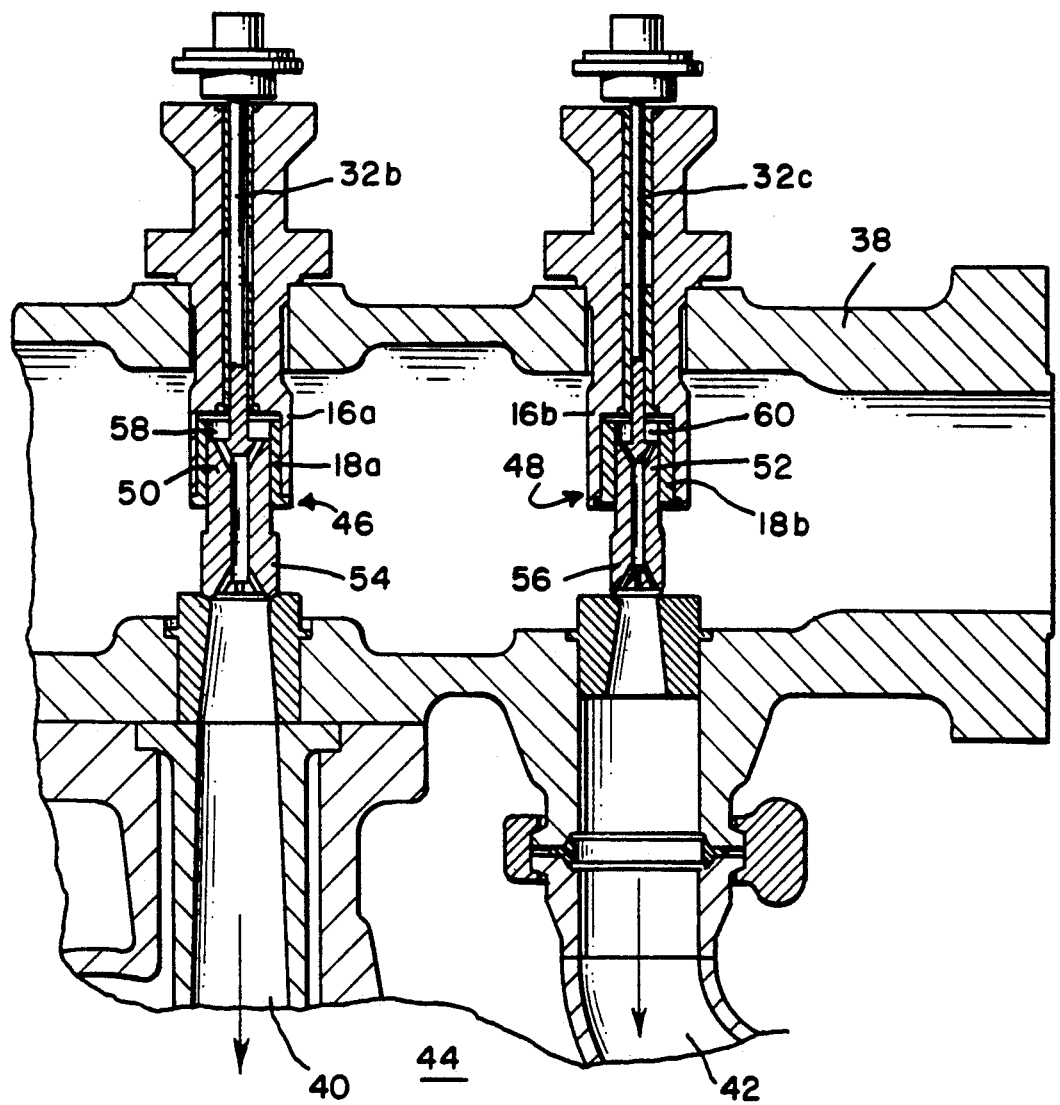
FIG. 3 is a cross-sectional view of a steam chest showing the novel, balanced, steam control valve assemblies arranged therein to control distribution of steam to annular sectors of a turbine inlet.
Figure 4:
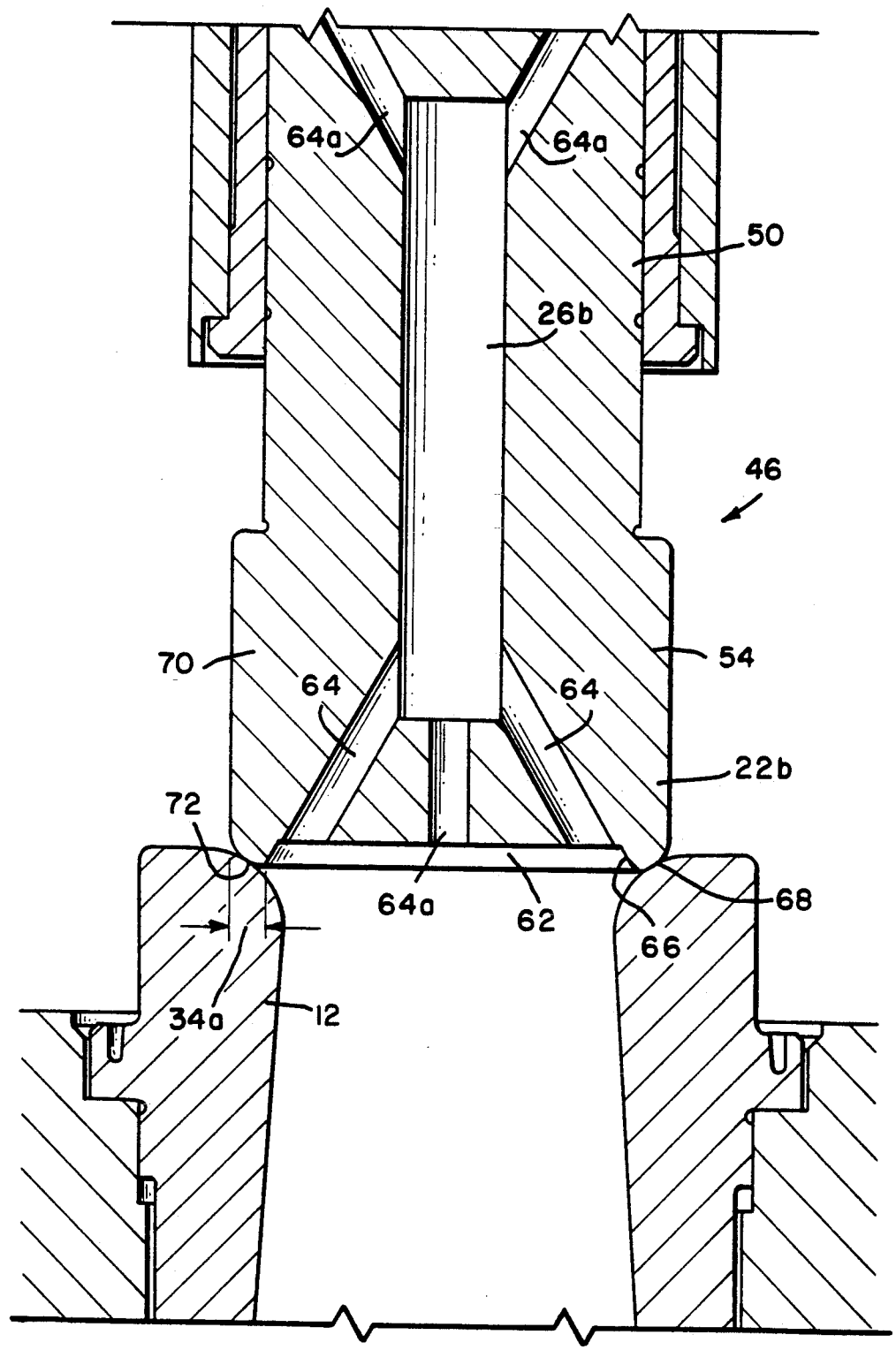
FIG. 4 is a view, greatly enlarged over the scale of FIG. 3, of the aforesaid novel, balanced, steam control valve assembly, the same incorporating the inventive plug-type valving element.

In FIGS. 2 through 4, components or parts which carry index numbers which are the same as or similar to those shown in FIG. 1 denote same or similar components as those in FIG. 1.

FIG. 2 depicts a prior art valving element 20a designed to overcome the failure of the "T"-connection of the FIG. 1 valving element 20. Here the stem 32a is integral with the balance-piston end 24a. However, here too, the central bore 26a opens only centrally onto the bottom of the plug end 22a. Employment of the valving element 20a will cause the aforesaid non-representative pressures to be communicated to the balance-piston end 24a. In addition, valving element 20a, for having a same, rounded, plug end 22a, will experience the same lengthy flow transition zone and extended fluid contact length, as arises from the use of valving element 20 of FIG. 1.

FIG. 3 shows a steam chest 38 which receives steam from a header (not shown) and which distributes the steam to annular sectors 40 and 42 of a turbine inlet 44. The novel balanced, steam control valve assemblies 46 and 48 are shown in traverse of the chest 38. Balance-piston ends 50 and 52 of the assemblies, which incorporate the inventive plug-type valving elements 54 and 56, translate within the bonnet guides 16a and 16b and guide bushings 18a and 18b. The ends 50 and 52 cooperate with the guides 16a and 16b and bushings 18a and 18b to define variable-volume chambers 58 and 60 therebetween in which the ends 50 and 52 operate.

An enlargement of one of the novel assemblies 46 is shown in FIG. 4. As shown, assembly 46 comprises a valving element 54 which has a circular recess 62 formed in the plug-end 22b thereof. The central, longitudinal bore 26b thereof communicates with a plurality of diverging passageways 64 (therebeing four, although only two are shown) which open onto the circular recess 62. In addition, a further, axially aligned passageway 64a proceeds directly from bore 26a and opens onto the center of the recess 62. The outer surface of the valving element 54 and the circumferential rim 66 of the recess 62 define a tapered, circumferential wall 68. Passageways 64 are tangent to the wall 68 and these, in cooperation with passageway 64a, insure that an average and representative pressure obtaining across the recess 62 will be conducted into bore 26a for communication with balance-piston end 50 and chamber 58.

Valving element 54 has no neck; it has, simply, a head 70 and stem 32b. The leading end of the head 70, which closes onto and removes from the valve seat 12 has a given diameter. The trailing end of the head, which comprises the balance-piston end 50, has a different, albeit not much smaller diameter, and this design gives the valving element 54 a mass which resists excursive steam pressures. The diameter of the trailing end or portion of element 54 is selected so that the net force on the complete structure will be within the capabilities of a valve control system. In the trailing end of valving element 54, further, diverging passageways 64a are provided, for communication with chamber 58, to accommodate the integral stem 32b.

It is to be noted that the outer surface of the element 54, at the leading end thereof, and the inner surface of wall 68, i.e., rim 66, is very narrow or short; the latter defines the flow transition zone or region 34a. It has a width dimension which is no more than ten percent of the diameter of the leading end of the head 70. In that the element 54 is substantially cylindrical, it hasn't the rounded plug shape of plug end 22 of valving element 20 (of FIG. 1). The straight-sided conformation of element 54, and generally flat-bottomed, recessed end, or leading end of the element 54, cooperate with the short transition zone to define a sharp change in surface slope 72 to cause flow separation.

While we have described our invention in connection with specific embodiments thereof, it is to be clearly understood that this is done only by way of example and not as a limitation to the scope of the invention as set forth in the objects thereof and in the appended claims.

We claim:

1. A balanced, steam control valve assembly, comprising:
   an annular valve seat;
   a plug-type valving element for closure upon, and removal from, said seat; and
   a valve bonnet having a central, longitudinal bore formed therethrough; wherein
   said valving element has a valving head and a stem;
   said stem is slidably engaged with said bore;
   said bonnet has a depending, cylindrical guide;
   said head is slidably engaged with said guide;
   said head has fluid-accommodating channel means formed therein for pressure-balancing one end of said head with an opposite end of said head;
   one end of said head has means formed therein for insuring that an average and representative pressure obtaining thereat will be addressed to an opposite end of said head via said channel means;
   said last-named means formed in one end of said head comprises a recess;
   said channel means comprises a central, axial bore formed in said head, and a plurality of passageways diverging from, and in fluid-flow communication with, said central, axial bore; and
   said passageways open, externally of said head, onto said one end, and said opposite end.

2. A balanced, steam control valve assembly, according to claim 1, wherein:
   said recess comprises a circular relief having a tapered, circumferential wall;
   said passageways which open onto said one end of said head open onto said relief and tangent of said wall; and
   said central, axial bore opens onto said relief and centrally of said relief.

3. A balanced, steam control valve assembly, according to claim 1, wherein:
   said opposite end of said head and said guide cooperatively define a variable-volume chamber therebetween.

4. A balanced, steam control valve assembly, according to claim 3, wherein:
   said passageways which open onto said opposite end of said head open onto said chamber.

5. A balanced, steam control valve assembly, according to claim 2, wherein:
   said head has an outer, circumferential surface;
   said surface and said wall define an annular transition zone therebetween;
   said head has a leading, seat-engaging portion, and a trailing, shank portion;
   said leading portion of said head has a diameter of a given dimension;
   said trailing portion has a diameter of a dimension which is less than said given dimension; and
   said transition zone has a width dimension which is no more than ten percent of said given dimension.

6. A balanced, steam control valve assembly according to claim 5, wherein: said diameter of said trailing portion is selected so that the net force on the complete structure will be within the capabilities of a valve control system.

7. A plug-type valving element, for a balanced, steam control valve assembly, comprising:
   a valving head and an integral stem; wherein
   said head has fluid-accommodating channel means formed therein for pressure-balancing one end of said head with an opposite end of said head;
   one end of said head has means formed therein for insuring that an average and representative pressure obtaining thereat will be addressed to an opposite end of said head via said channel means;

said last-named means formed in one end of said head comprises a recess;

said channel means comprises a central, axial bore formed in said head, and a plurality of passageways diverging from, and in fluid-flow communication with, said central, axial bore; and said passageways open, externally of said head, onto said one end, and said opposite end thereof.

8. A plug-type valving element, for a balanced, steam control valve assembly, according to claim 7, wherein:

said recess comprises a circular relief having a tapered, circumferential wall;

said passageways which open onto said one end of said head open onto said relief and tangent to said wall; and said central, axial bore opens onto said relief and centrally of said relief.

9. A plug-type valving element, for a balanced, steam control valve assembly, according to claim 8, wherein:

said head has an outer, circumferential surface;

said surface and said wall define an annular transition zone therebetween;

said head has a leading, valve seat-engaging portion, and a trailing, shank portion;

said leading portion of said head has a diameter of a given dimension;

said trailing portion has a diameter of a dimension which is typically less than said given dimension; and said transition zone has a width dimension which is not more than ten percent of said given dimension.

10. A plug-type valving element, for a balanced, steam control valve assembly, according to claim 9, wherein:

said diameter of said trailing portion is not less than approximately eighty percent of said diameter of said leading portion.

* * * * *